Feb. 26, 1952  W. E. NAUGLER ET AL  2,586,982
LIMIT STOP MECHANISM FOR GUN TURRETS
Filed June 1, 1948  15 Sheets-Sheet 5
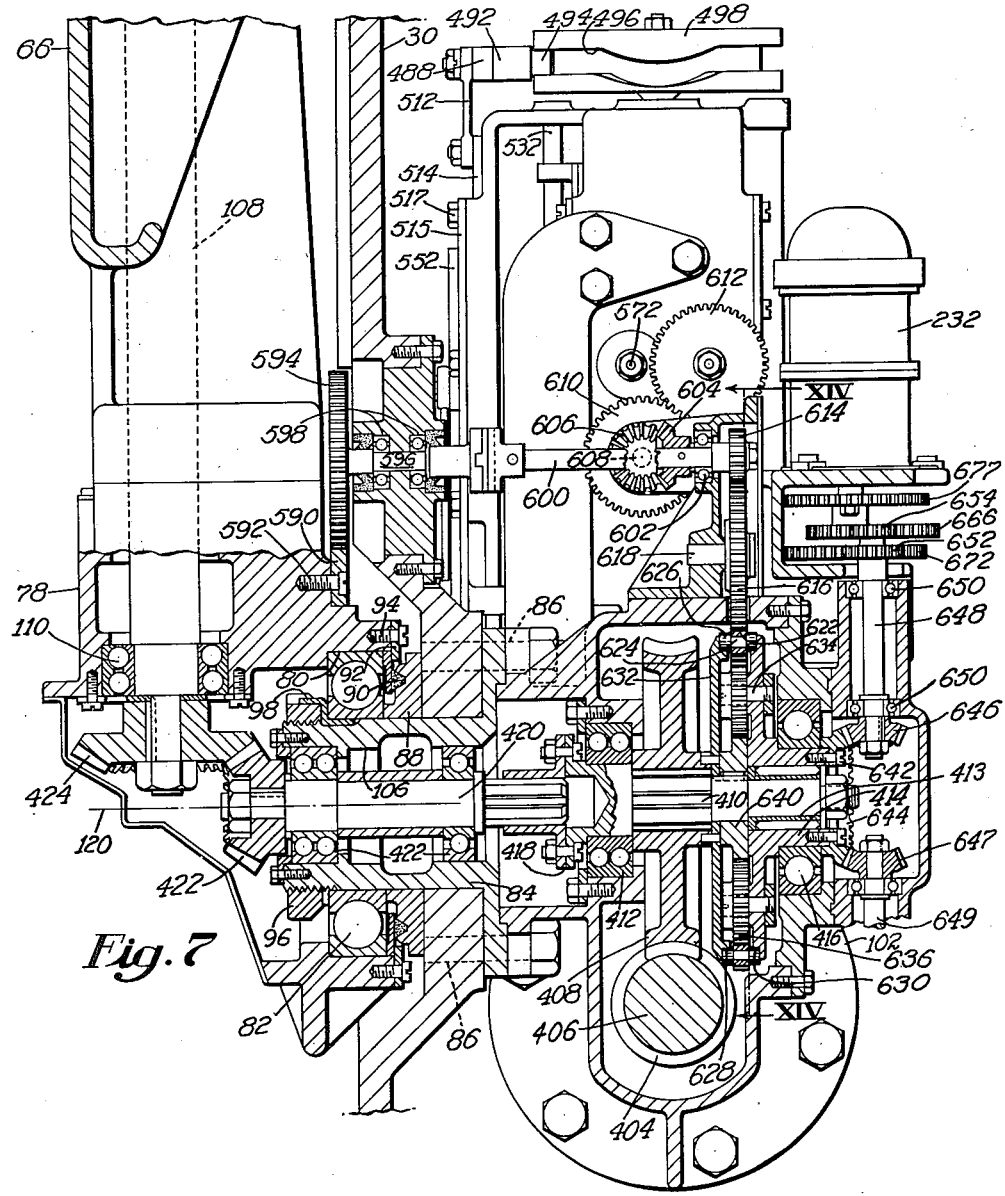
Fig. 7
*Inventors*
Walter E. Naugler
Ernest W. Stacey
By their Attorney

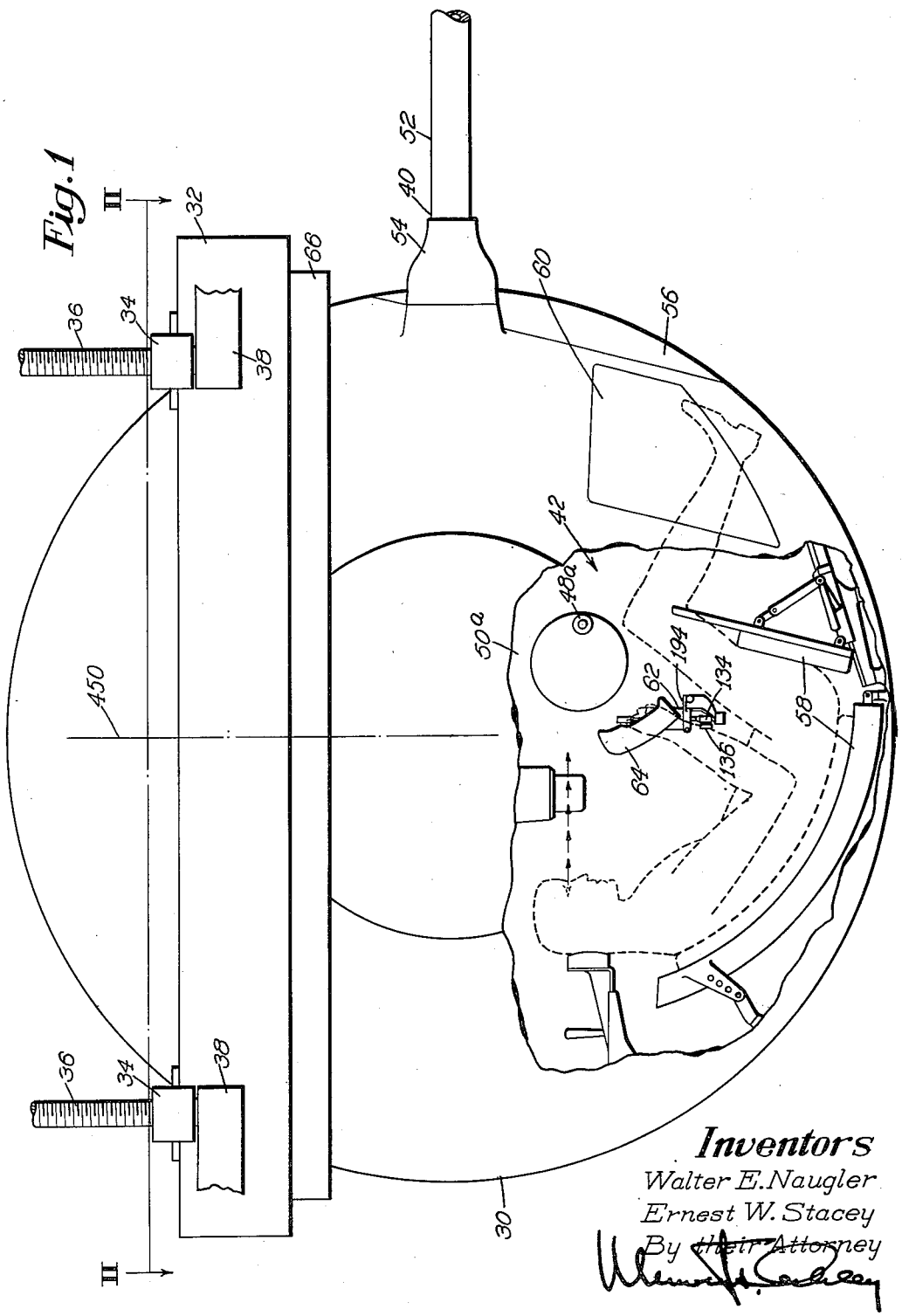

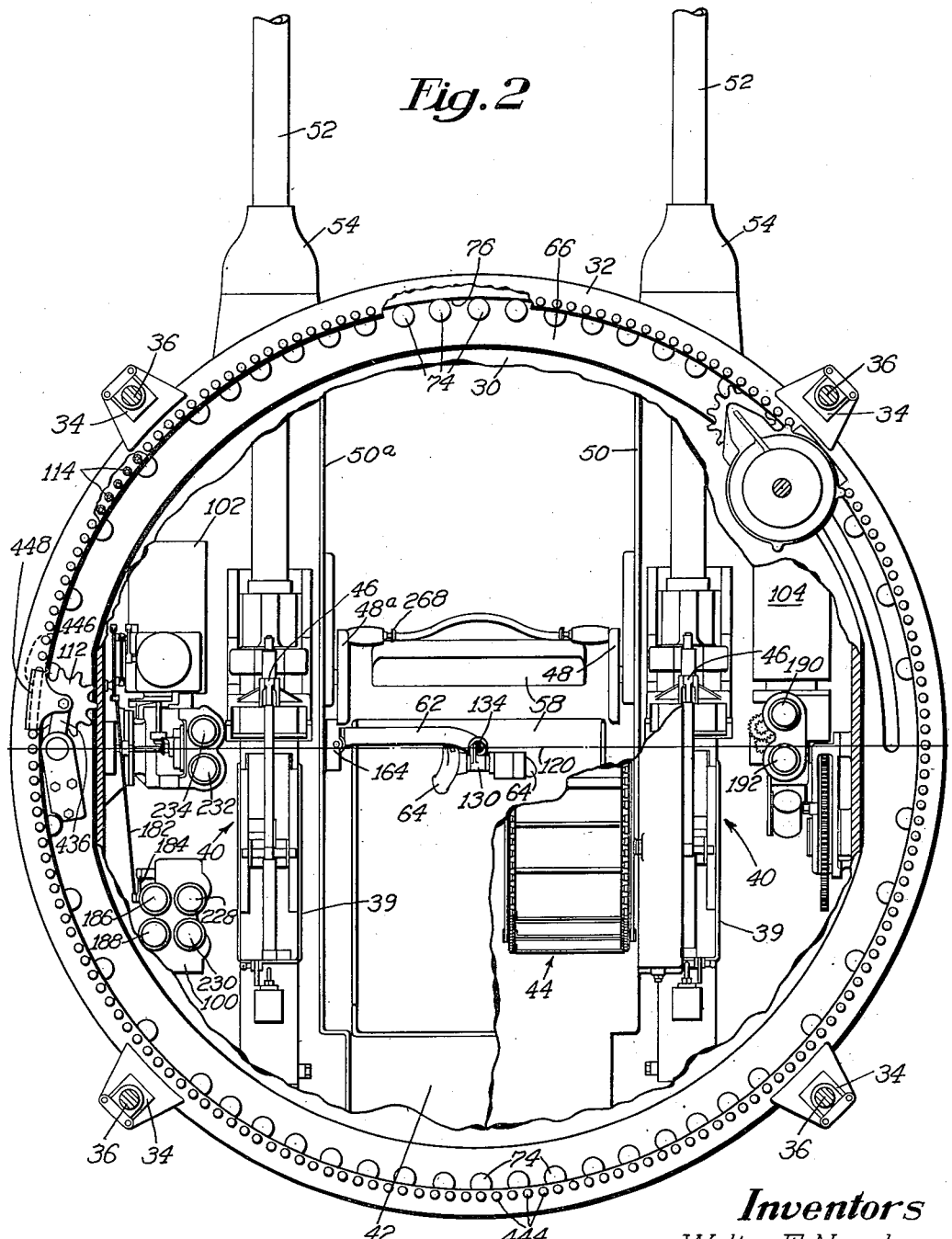

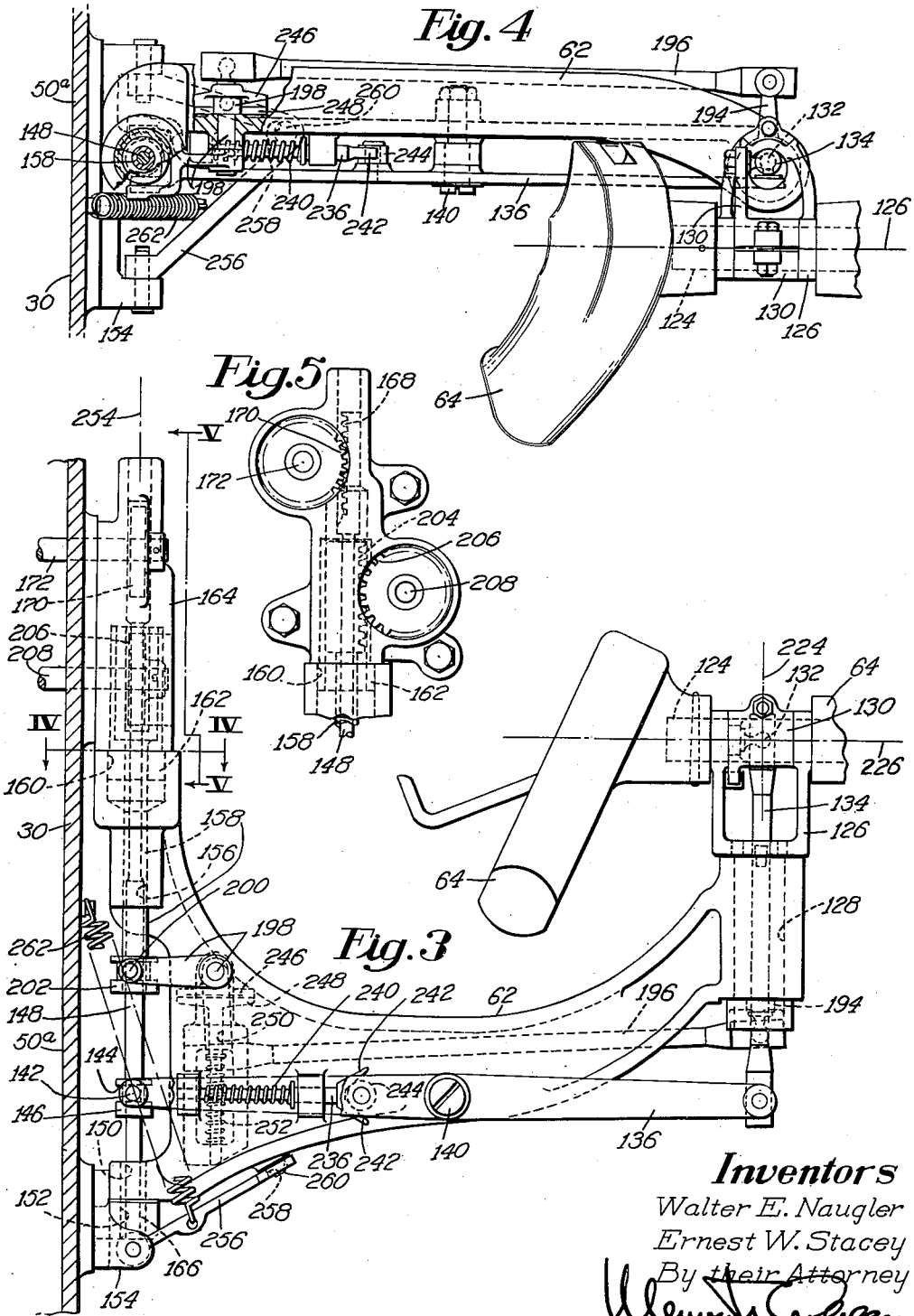

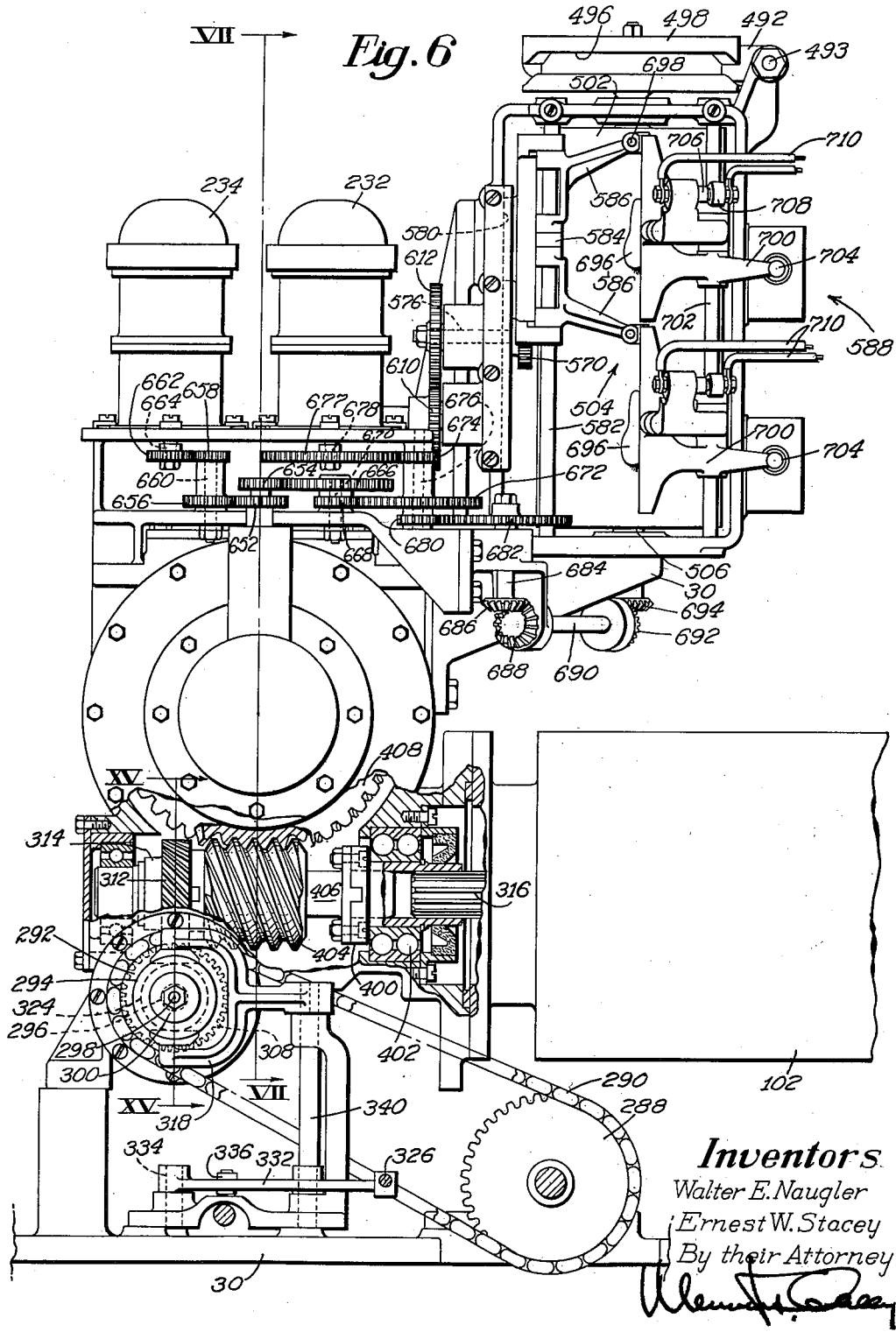

Feb. 26, 1952   W. E. NAUGLER ET AL   2,586,982
LIMIT STOP MECHANISM FOR GUN TURRETS
Filed June 1, 1948   15 Sheets-Sheet 8

Inventors
Walter E. Naugler
Ernest W. Stacey
By their Attorney

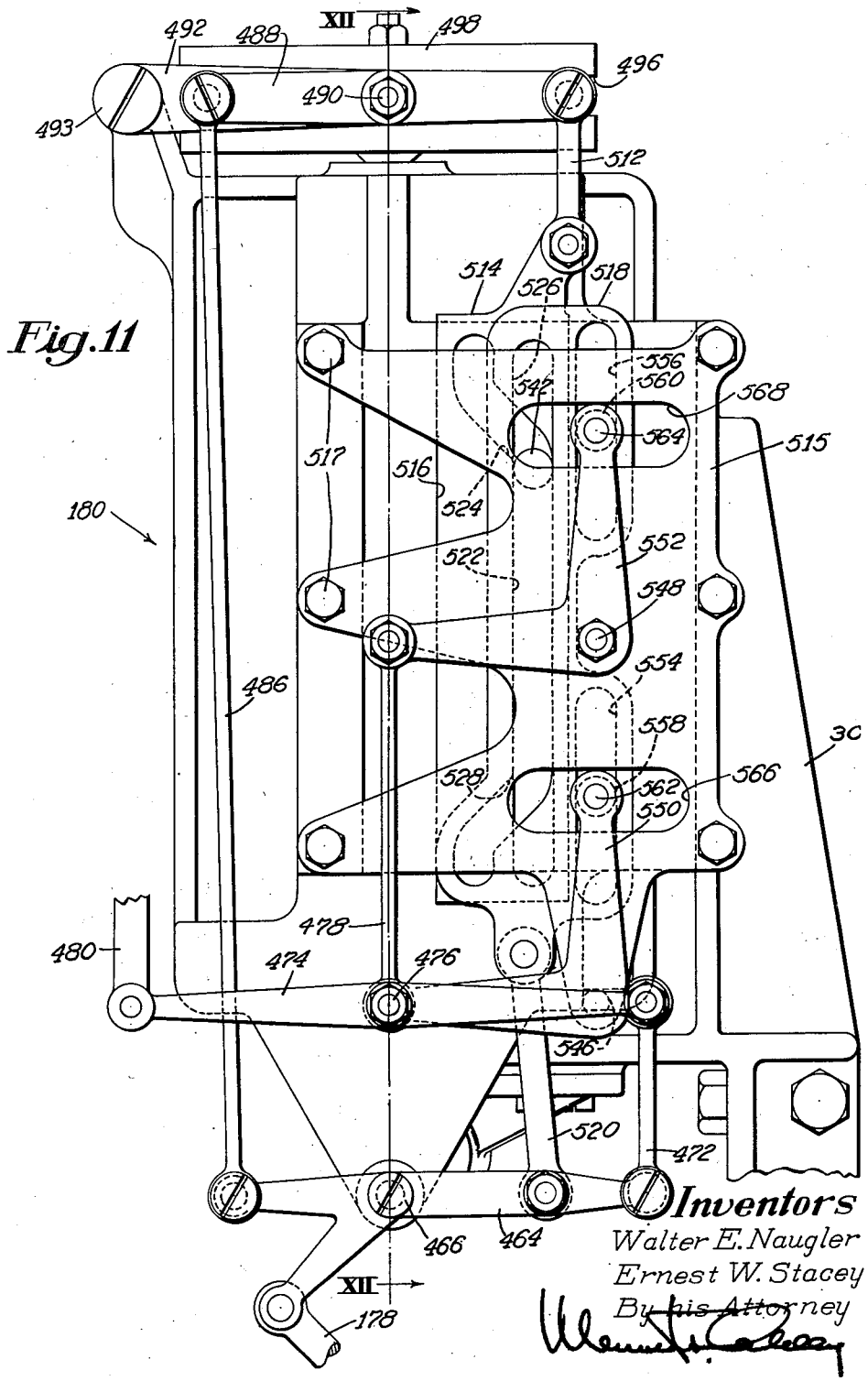

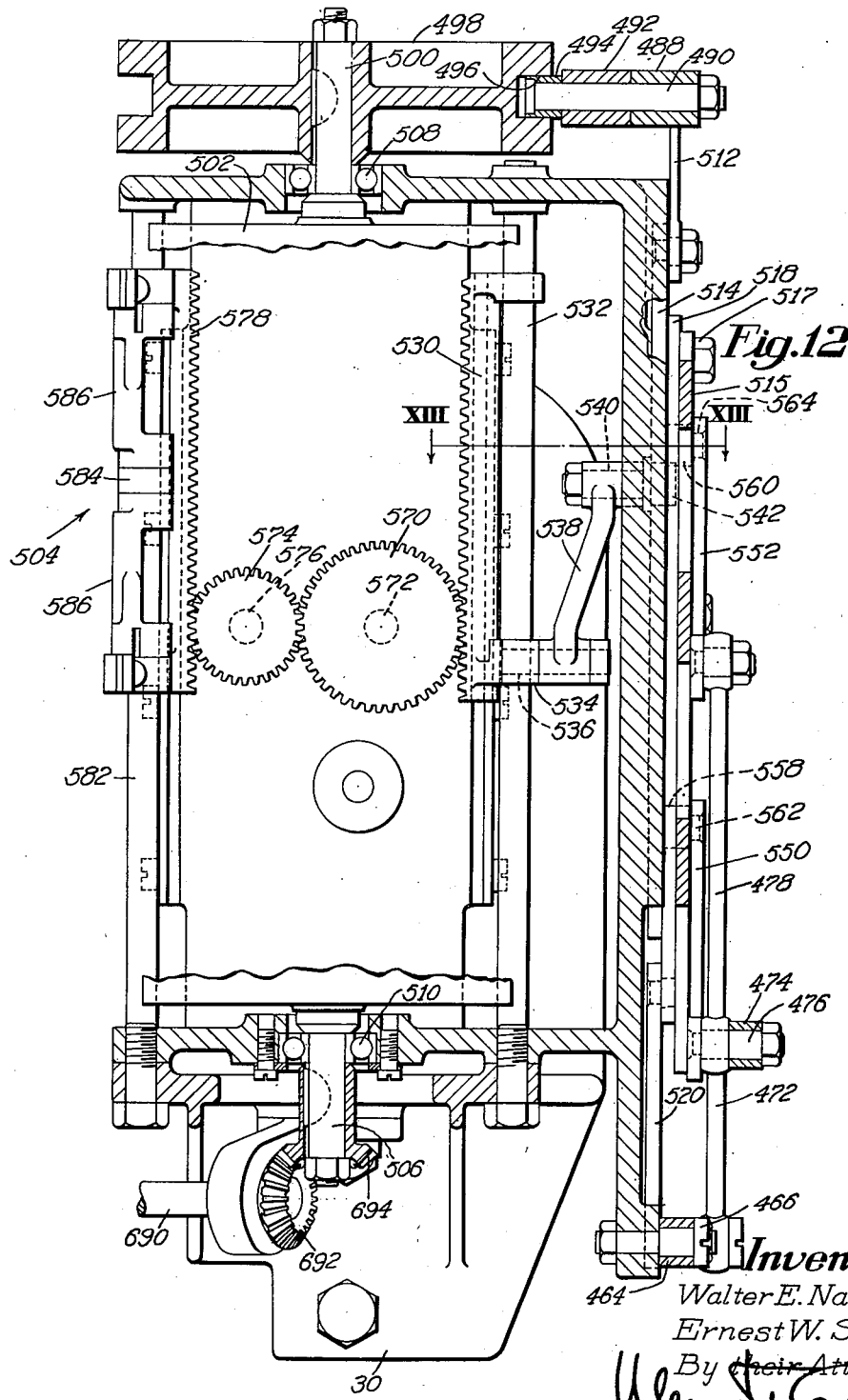

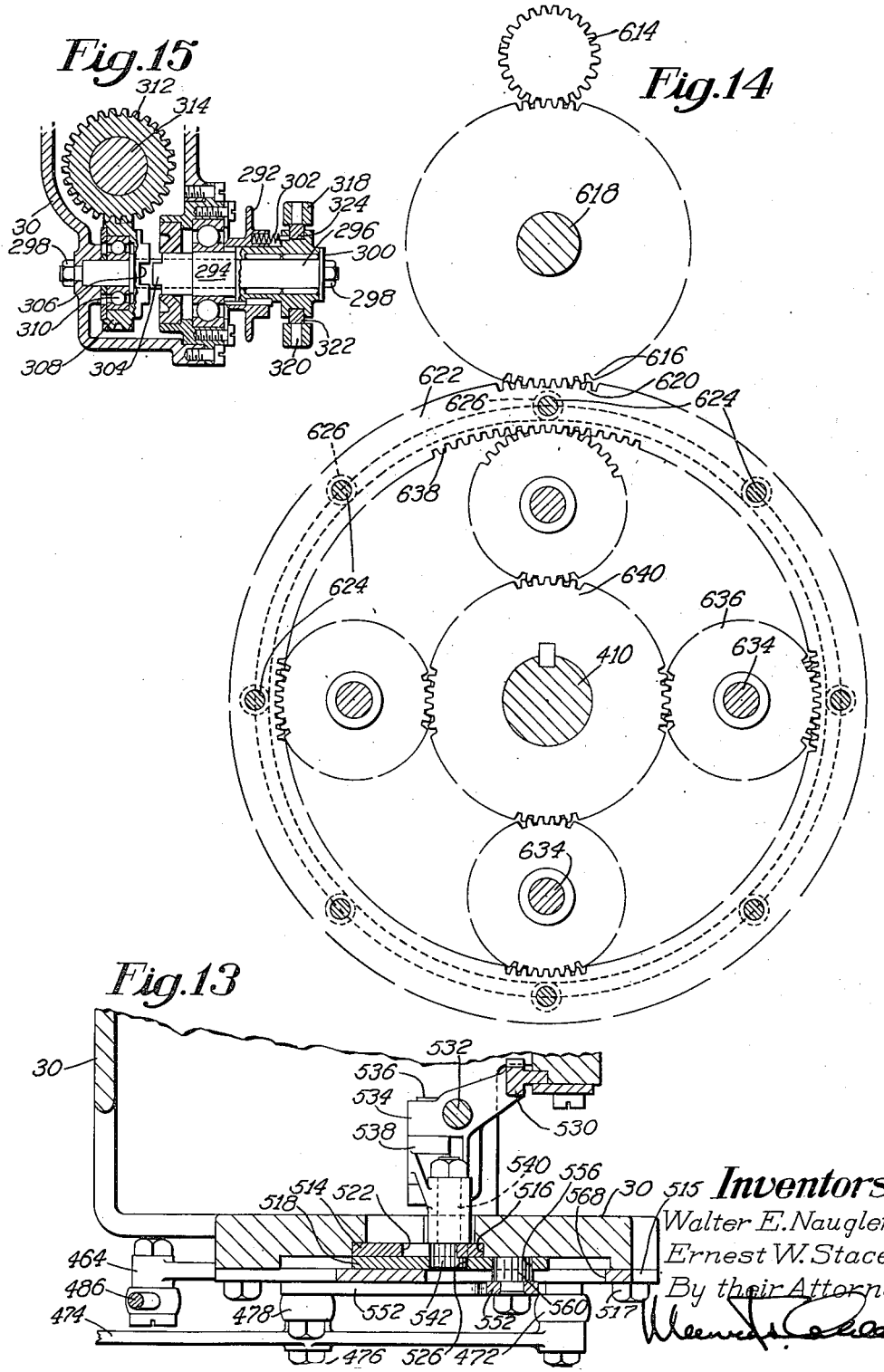

Inventors
Walter E. Naugler
Ernest W. Stacey
By their Attorney

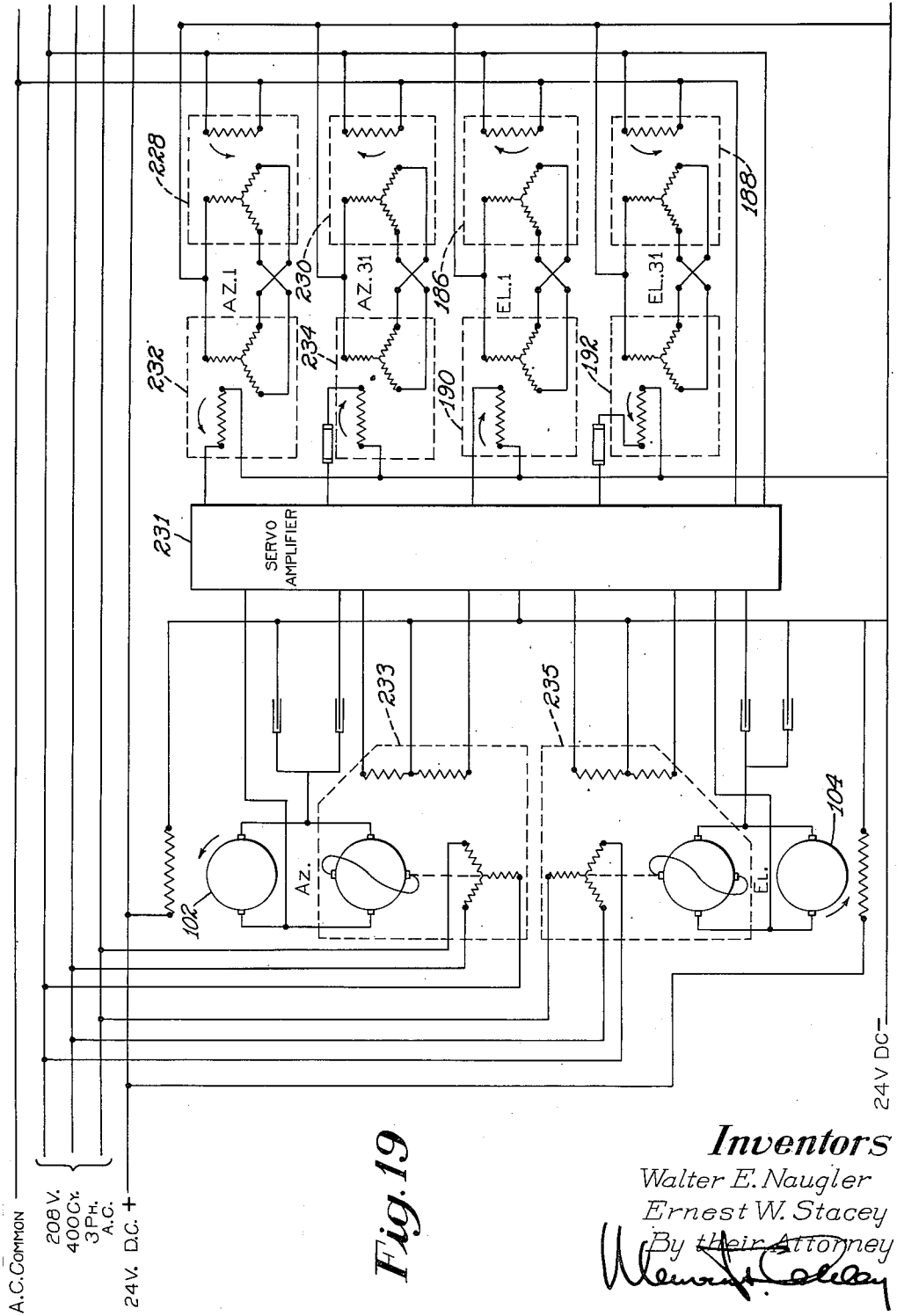

Patented Feb. 26, 1952

2,586,982

UNITED STATES PATENT OFFICE 2,586,982

LIMIT STOP MECHANISM FOR GUN TURRETS

Walter E. Naugler and Ernest W. Stacey, Beverly, Mass., assignors to United Shoe Machinery Corporation, Flemington, N. J., a corporation of New Jersey Application June 1, 1948, Serial No. 30,328

1 Claim. (Cl. 89—41)

This invention relates to ordnance and is illustrated as embodied in an armed mount of the general type disclosed in an application for United States Letters Patent Serial No. 707,216, filed November 1, 1946 in the names of Ernest W. Stacey et al., patented February 20, 1951, as Patent No. 2,542,217, it being an object of the invention to provide an improved armed mount which may be used effectively in long range aircraft.

The present invention consists in novel features hereinafter described, reference being had to the accompanying drawings which show one embodiment of the invention selected for purposes of illustration, and said invention being fully disclosed in the following description and claim.

In the drawings,

Fig. 1 is a side view, partly broken away, of the illustrative armed turret;

Fig. 2 is a section on line II—II of Fig. 1;

Fig. 3 is a rear view of hand grip control mechanism, partly broken away, which is located in a gunner's compartment shown in Figs. 1 and 2;

Fig. 4 is a plan view of portions of the mechanism illustrated in Fig. 3, part of said view being taken on line IV—IV of Fig. 3;

Fig. 5 is a view on line V—V of Fig. 3;

Fig. 6 is a side elevation, partly broken away and partly in section, of portions of an azimuth drive and limit stop and fire interrupter mechanism;

Fig. 7 is a section on line VII-VII of Fig. 6;

Fig. 11 is an enlarged view, partly broken away, showing in detail the elevation limit stop mechanism;

Fig. 12 shows a section on line XII—XII of Fig. 11;

Fig. 13 shows a section on line XIII—XIII of Fig. 12;

Fig. 14 is an enlarged view on line XIV—XIV of Fig. 7;

Fig. 15 is a section on line XV—XV of Fig. 6;

Fig. 19 is a turret wiring control diagram.

Figure 8:
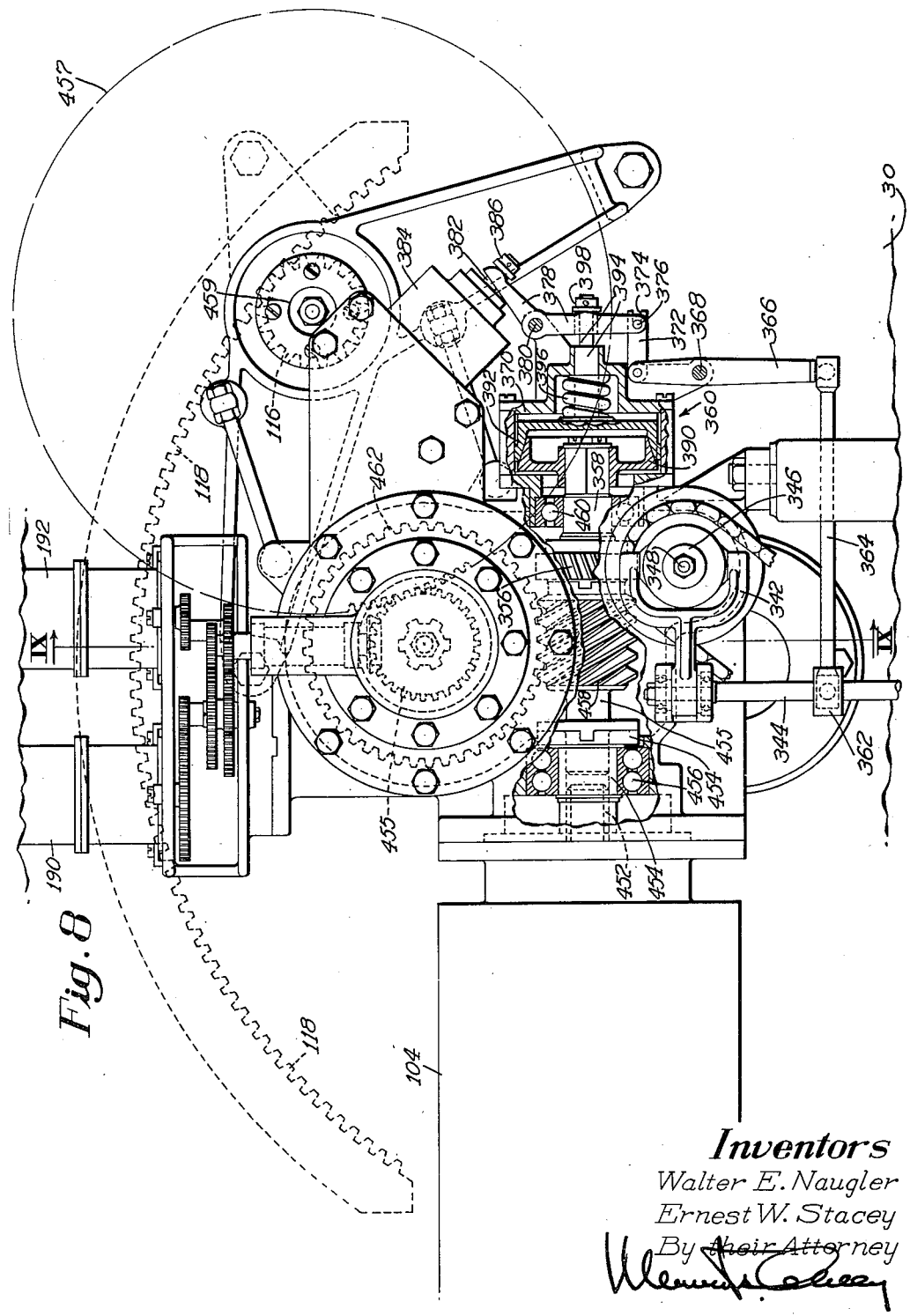
Fig. 8 shows in side elevation portions of mechanism for driving the turret in elevation.

An illustrative turret 30, best shown in Figs. 1 and 2, has a support ring 32 to which are secured four nuts 34 in threaded relation with screws 36 rotatably mounted in housings 38 (Fig. 1) (only two shown) forming part of a fuselage of an airplane. The screws 36 are rotated at the same speed by mechanism operated by an electric motor (not shown) which is controlled either from the outside of the turret 30 or from the inside of the fuselage. By mounting the support ring 32 on the screws 36, the turret may be quickly and effectively raised to a retracted position inside the fuselage or may be projected to a firing position below the "belly" of the fuselage. Since the mechanism for supporting the turret 30 and for moving it to and from its firing position is substantially identical with mechanism for operating the turret disclosed in said Patent No. 2,542,217, such mechanism will not be described herein in detail.

Figure 17:
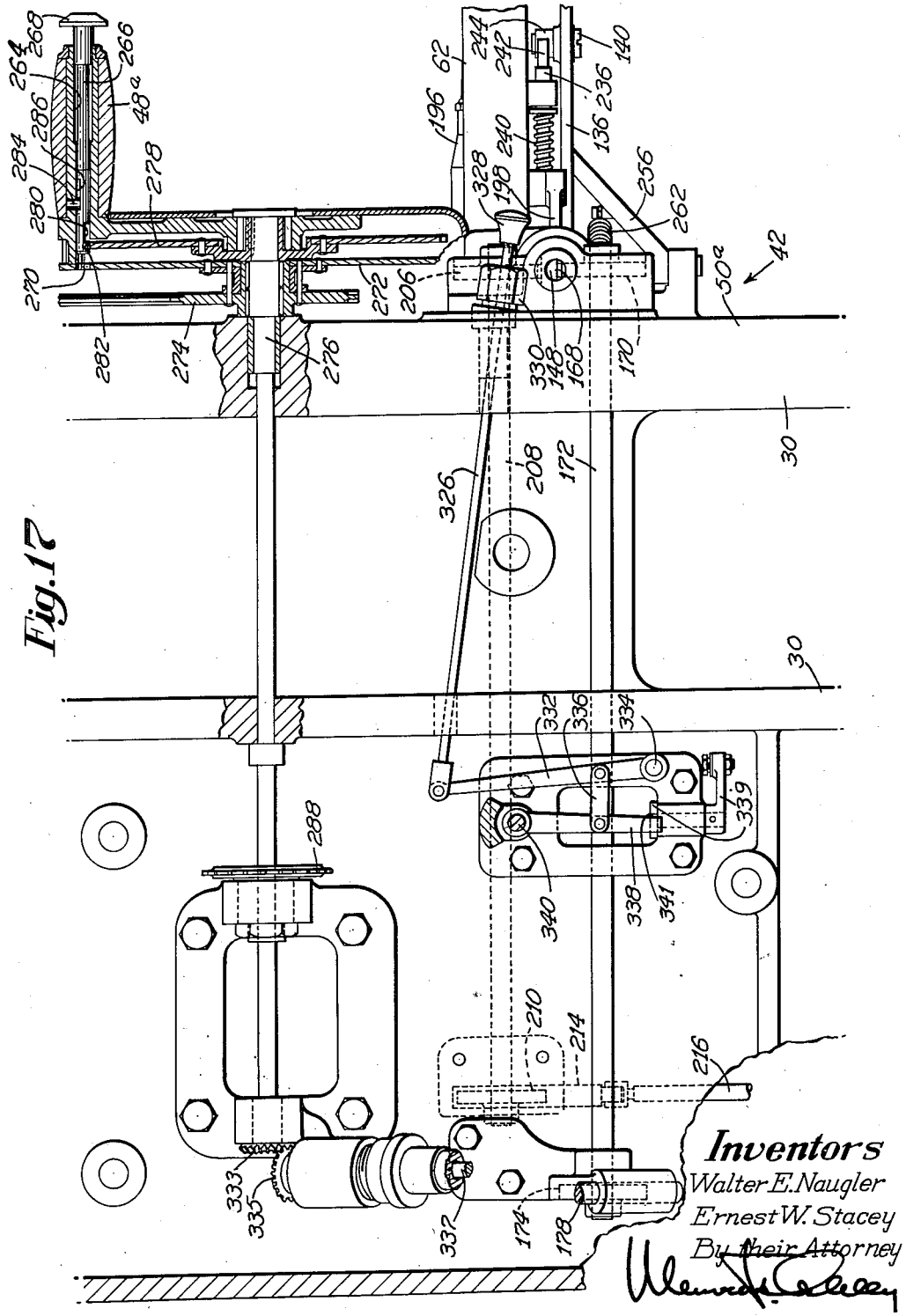
Fig. 17 is a plan view of a portion of mechanism for manually operating the turret in azimuth when the power is off.
Figure 18:
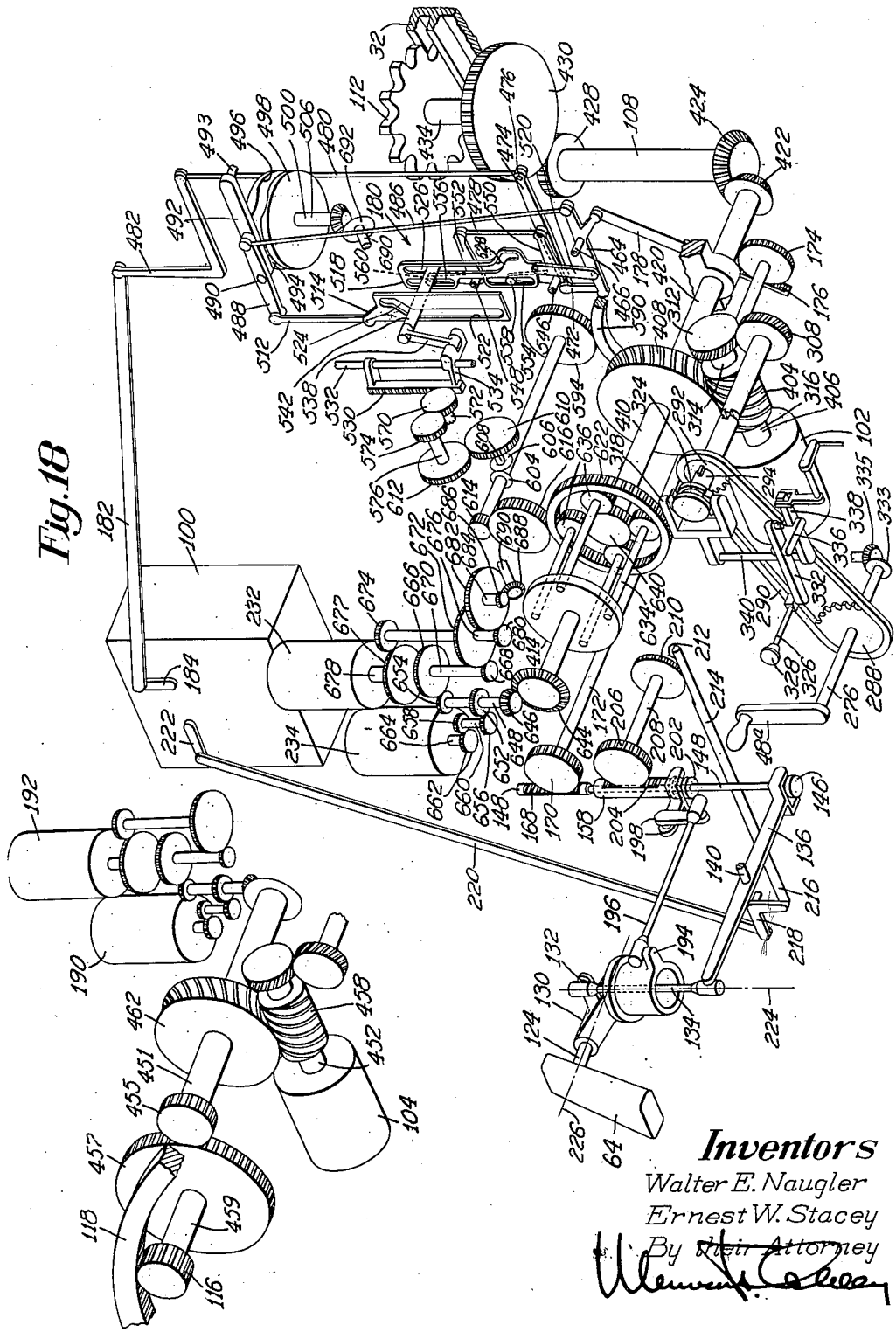
Fig. 18 is a schematic view showing in perspective portions of the mechanism for driving and controlling movement of the turret.

The turret 30 has secured to its receivers 39 (Fig. 2) of a pair of 37 mm. guns 40 which are disposed at opposite sides, and extend outside of a gunner's compartment 42 (Figs. 1, 2 and 17) and are automatically supplied with ammunition by feeders 44 (Fig. 2) secured to and arranged inside the turret. Chargers 46 controlled by cranks 48, 48a (Figs. 1, 2, 17 and 18) rotatably mounted in side walls 50, 50a of the gunner's compartment 42 of the turret 30 are also provided. The ammunition feeders 44 from the subject-matter of an application for United States Letters Patent Serial No. 637,236, filed December 26, 1945, in the names of Ernest W. Stacey and Frank W. Reinhold, patented January 17, 1950, as Patent No. 2,494,728, and the chargers 46 form the subject-matter of an application for United States Letters Patent Serial No. 659,053, filed April 2, 1946, in the names of Ernest W. Stacey and Augustus D. Willhauck, and patented November 14, 1950, as Patent No. 2,529,822.

In Patent No. 2,542,217 there is disclosed an upper turret having hydraulic rate control mechanism for moving such turret in azimuth and elevation. The illustrative turret 30, which will be referred to as a lower turret and was developed for use in an airplane together with said upper turret, is provided with manually movable electric rate and space control mechanism commonly referred to as aided tracking mechanism. Barrels 52 of the guns 40 extend through sealing clips 54 of the turret 30 which is provided with a suitable number of windows, including front windows 56 (Fig. 1), and has an adjustable gunner's support 58 arranged at the lower portion of the compartment 42. The gunner enters the turret through a door 60, a bracket 62 (Figs. 1, 2, 3, 4 and 17) upon which hand grips or controls 64 are mounted being swingable, as will be hereinafter explained, to enable the gunner to assume his position shown in Fig. 1.

Rotatably mounted upon the support ring 32 is an azimuth ring 66 (Figs. 1, 2, 7, 9 and 16) provided with a circumferentially arranged series of studs 68 (Fig. 16) which are secured to the azimuth ring and carry rollers 70 fitting in a circumferential groove 72 of the support ring. The azimuth ring 66 also carries a plurality of antifriction rollers 74 (Figs. 2 and 16) which engage an internal cylindrical face 76 (Fig. 16) of the support ring 32.

The azimuth ring 66 has at its opposite sides depending extensions 78 (Figs. 7, 9 and 16) which are provided with recesses 80 for receiving bearings 82 for trunnions 84 (Fig. 7), 84a (Fig. 9), respectively of the turret, said trunnions being secured to the turret by bolts 86, 86a. Interposed between the turret 30 and the trunnion bearings 82 are spacers 88, 88a, the spacer 88 being provided with a groove for receiving portions of a sealing ring 90 which is clamped to an outside raceway of the bearing 82 by a plate 92 secured by screws 94 to one of the extensions of the azimuth ring 66. Threaded onto the outside of each of the trunnions 84, 84a is a nut 96 which is held in its adjusted position upon its associated trunnion by a lock piece 98.

Figure 10:
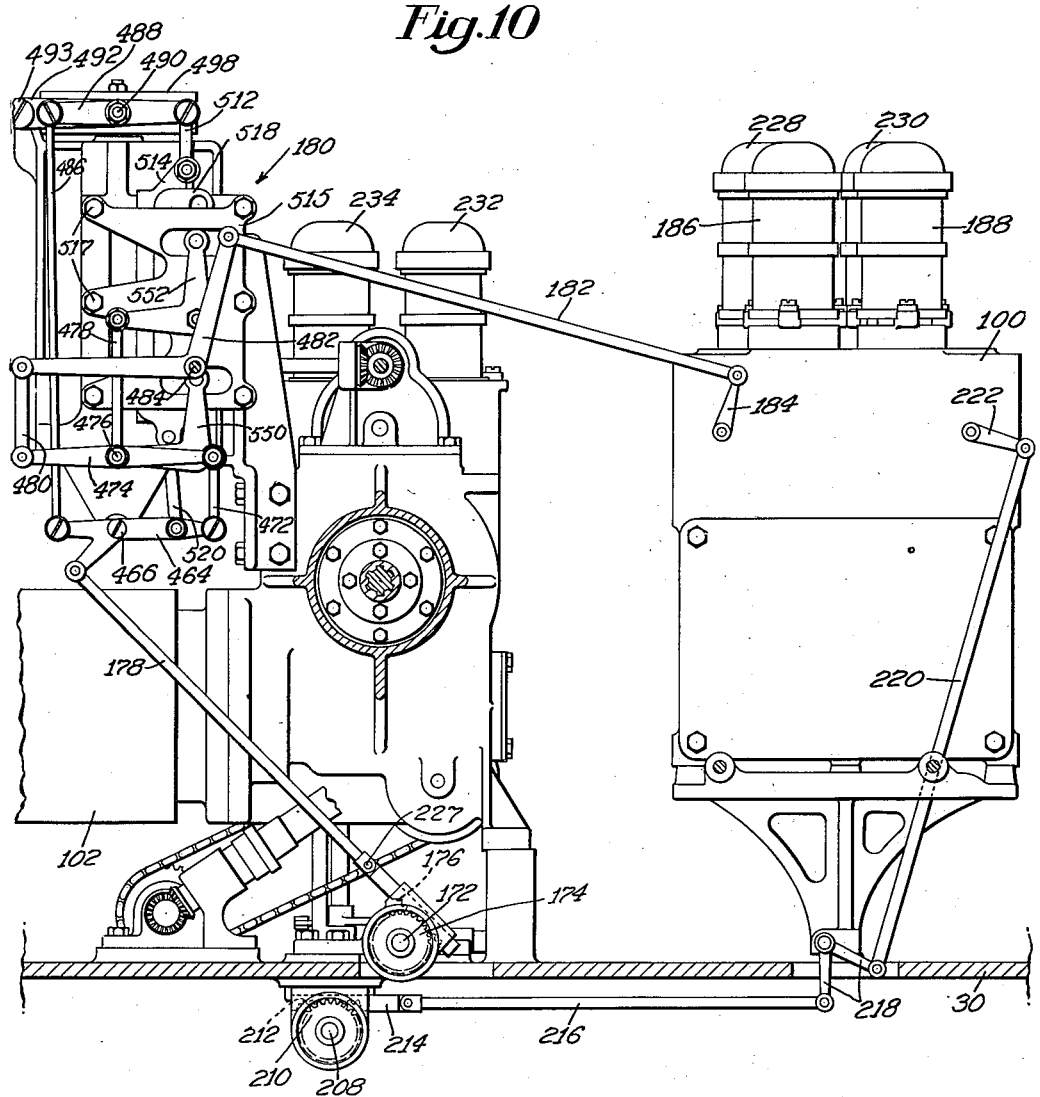
Fig. 10 shows in side elevation portions of the azimuth drive, an aided tracking box and portions of mechanism for automatically limiting movement of the turret in elevation.

The electrically powered mechanism for moving the turret 30 in azimuth and elevation is for the most part housed within and supported by the turret 30 and comprises aided tracking mechanism which is housed in a box 100 (Figs. 10 and 18) and may be referred to as an aided tracking box. The aided tracking box 100 is controlled by the hand grips 64 and is constructed and arranged as disclosed in an application for United States Letters Patent Serial No. 779,472, filed October 13, 1947 in the names of Lloyd G. Miller and Ernest W. Stacey, and patented November 8, 1949, as Patent No. 2,487,256. Azimuth and elevation motors 102 (Figs. 2, 6, 7, 10 and 19), 104 (Figs. 2, 8, 18 and 19) which are screwed or otherwise secured to the turret 30 along the left and right inside walls of said turret, as viewed in Fig. 2, are operated through selsyn transmitter and transformer controls which are well-known in the art and are disclosed in United States Letters Patent No. 1,626,824, granted May 3, 1927 on an application filed in the names of Hewlett et al. Since selsyn remote control mechanism is well-known in the art and forms no part of the present invention, such mechanism is not described in detail herein.

An azimuth drive for the turret 30 includes mechanism which is powered by the azimuth motor 102, and as best illustrated in Fig. 7, passes through a hollow passage 106 in the trunnion 84 and operates a vertical shaft 108 rotatable upon ball bearings 110 (Figs. 7 and 16) mounted in the extension 78 of the azimuth ring 66. The vertical shaft 108, through mechanism which will be hereinafter described, is operatively connected to a sprocket 112 (Figs. 2, 16 and 18) which meshes with a circular series of rollers 114 (Figs. 2 and 16) carried by the support ring 32, the construction and arrangement being such that rotation of the sprocket causes rotation of the azimuth ring 66 upon the support ring.

Figure 9:
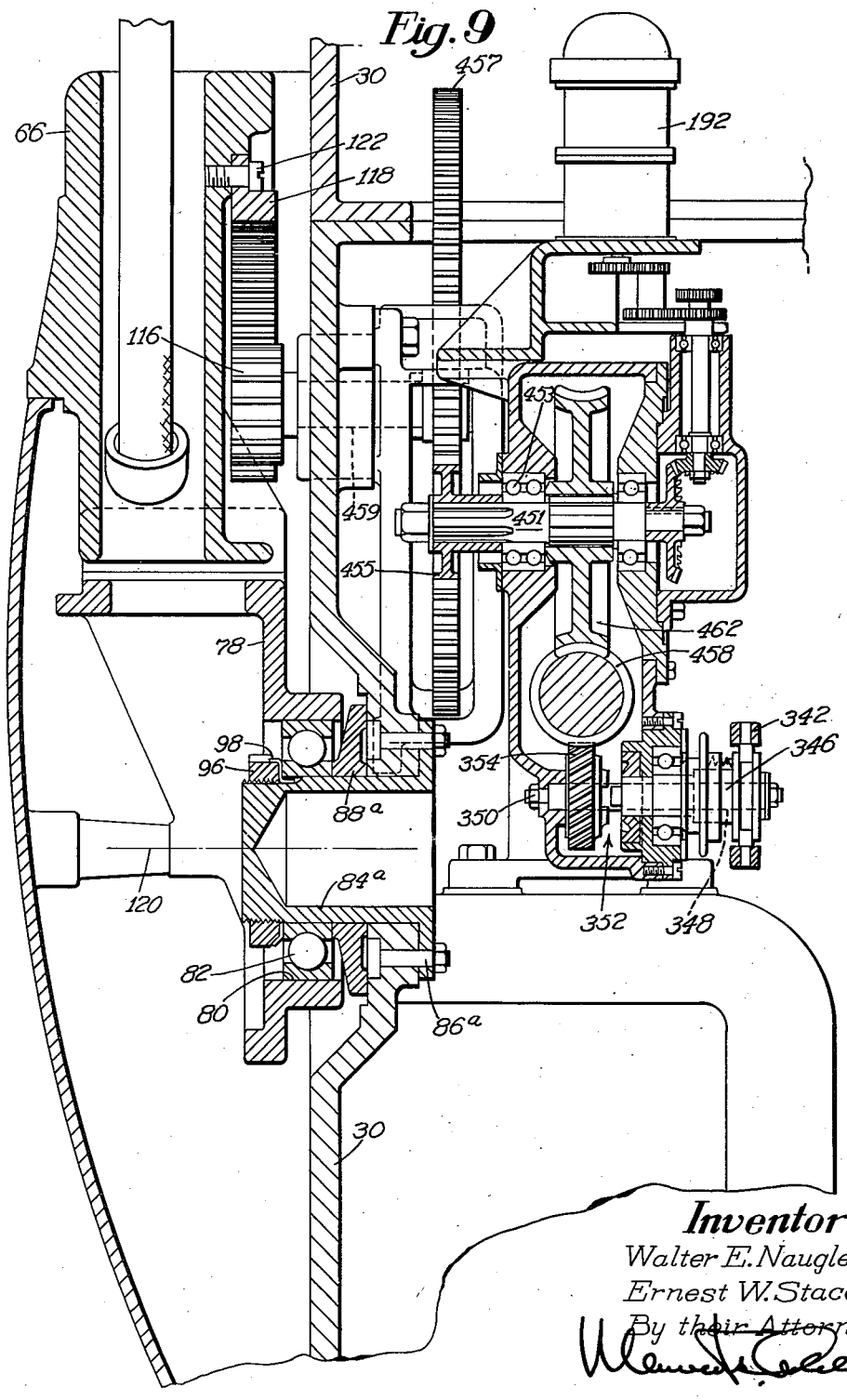
Fig. 9 is a section on line IX—IX of Fig 8.
Figure 16:
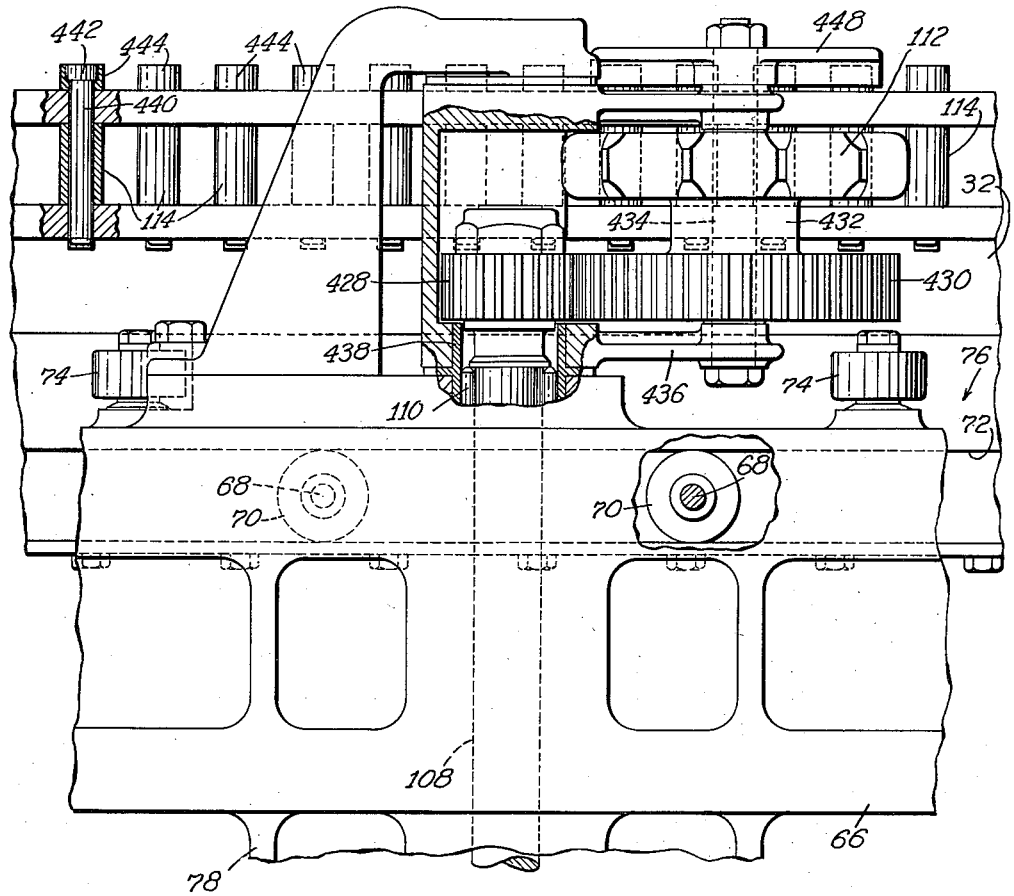
Fig. 16 is a view, partly in section, showing on an enlarged scale portions of the azimuth drive.

An elevation drive of the turret 30 includes the elevation motor 104 (Figs. 2, 8 and 18) to which, through mechanism hereinafter described, is operatively connected an elevation pinion 116 which is rotatably mounted in the frame of the turret and is in meshing engagement with an arcuate rack 118 (Figs. 8, 9 and 16). The arcuate rack 118 is arranged in concentric relation with an axis of rotation 120 of the trunnions 84, 84a and is secured by bolts 122 (Fig. 9) to the azimuth ring 66, the construction and arrangement being such that rotation of the pinion 116 causes the turret 30 to move about the axis of rotation 120 with the result that the guns are moved in elevation about said axis.

Grip controls

The grips 64 are pinned to a shaft 124 (Figs. 3, 4 and 18) which passes through alined bores in a yoke 126 (Figs. 3 and 4) a shank of which is rotatably mounted in a cylindrical recess 128 (Fig. 3) in a boss of the bracket 62. Clamped upon the shaft 124 and in a bifurcation of the yoke 126 is a spacer portion of an elevation arm 130 (Figs. 2, 3, 4 and 18) which is operatively connected by a ball and socket 132 to the upper end of a rod 134 universally connected to a lever 136 fulcrumed upon a pin 140 threaded into the bracket 62. A bifurcated left end of the lever 136 as viewed in Fig. 3 carries pins 142 (Fig. 3) constructed and arranged to fit in a circumferential groove 144 of a collar 146 secured to a vertically arranged rod 148 (Figs. 3, 4, 5, 17 and 18), the lower end of which is slidingly mounted in a bore 150 (Fig. 3) of a sleeve 166 secured to the bracket 62 and the central portion of which fits slidingly in a bore 156 of a sleeve 158 forming part of the elevation drive which will be described later. The bracket 62, which is swingable counterclockwise from its effective position shown in Fig. 2 to permit the gunner to assume the position shown in Fig. 1, has a recess 160 (Figs. 3 and 5) for receiving a depending stud 162 of a boss 164 secured to the side wall 50a and has secured to it the depending sleeve 166 fitting in a bore 152 of a boss 154 fixed to said side wall. As will be explained later, the sleeve 158 is slidingly mounted in alined bores of the bracket 62 and the stud 162 of the boss 164 respectively. The upper end of the rod 148 has formed on it a rack 168 (Figs. 5, 17 and 18) meshing with a pinion 170 pinned to one end of a shaft 172 (Figs. 3, 5, 10, 17 and 18) which is rotatable in the turret frame and has at its other end a gear 174 (Figs. 10, 17 and 18) meshing with a rack 176 which is pivoted by means of a pin 277 to a rod 178 and through limit stop mechanism 180 hereinafter described, actuates a link 182 (Figs. 2, 10 and 18) pivoted to an elevation arm 184 of the aided tracking box 100 which as above stated, is described in detail in said Patent No. 2,487,256, to actuate through elevation selsyn transmitters 186 (Figs. 2, 10 and 19), 188 and selsyn transformers or receivers 190 (Figs. 2, 8, 18 and 19), 192, the elevation motor 104.

To the lower end of the yoke 126 in which the grip carrying shaft 124 is rotatably supported is secured an arm 194 (Figs. 1, 3, 4 and 18) operatively connected through a rod 196 (Figs. 3, 4, 17 and 18) to an offset bell crank lever 198 journaled in the bracket 62. Secured to a bifurcated portion of the bell crank lever 198 are pins 200 (Fig. 3) fitting in a groove of a collar 202 secured to the sleeve 158 through which the vertical rod 148 slides. The sleeve 158 has an enlarged upper end portion provided with a rack 204 (Figs. 5 and 18) in driving relation with a pinion 206 (Figs. 3, 5, 17 and 18) secured to one end of a shaft 208 which is journaled in the turret frame and has secured to its other end a gear 210 (Figs. 10, 17 and 18) meshing with a rack 212 of a slide 214 operatively connected through a link 216, a bell crank lever 218 (Figs. 10 and 18) and a link 220 to an azimuth arm 222 of the aided tracking box 100.

It will thus be apparent that displacement of the grips 64 in azimuth about an axis 224 (Figs. 3 and 18) of the yoke 126 and in elevation about an axis 226 (Figs. 3, 4 and 18) of the shaft 124 will move the azimuth and elevation levers 222, 184 of the aided tracking box 100 and thus through mechanism disclosed in said Patent No. 2,487,256 will actuate through azimuth selsyn transmitters 228, 230 (Figs. 2, 10 and 19) and azimuth selsyn transformers or receivers 232, 234 (Figs. 2, 6, 10, 18 and 19) and azimuth motor 102.

The elevation selsyn transformers or receivers 190, 192 and the azimuth selsyn transformers or receivers 232, 234 are wired to a servo amplifier 231 (Fig. 19) and to azimuth and elevation motor generators 233, 235 which are located outside of the turret and are wired to the azimuth and elevation motors 102, 104 respectively. Power is supplied to and from the turret 30 through suitable collector rings (not shown).

It is desirable that when the grips 64 are released they shall move automatically to neutral positions illustrated in Figs. 3 and 4. Accordingly, there is movable in bores of the bracket a slide 236 which is normally urged to the right as viewed in Figs. 3, 4 and 17 by a spring 240 and has a V-shaped head 242 engaging a roll 244 carried by the lever 136. When the lever 136 is displaced from its neutral position the slide 236 yields against the action of the spring 240 and when the grips 64 are released the fork 242 acting through the roll 244 returns the lever to its neutral position.

In order automatically to centralize the azimuth drive when the grips 64 are released the bell crank lever 198 has an abutment 246 which is constantly engaged by an opposing flared end of a slide 248 mounted for reciprocation in a guideway 250 of the bracket 62 and is constantly forced upward as viewed in Fig. 3 by a spring 252. When the grips 64 are in their neutral positions in azimuth the abutment 246 and the flared end of the slide 248 are in the positions shown in Fig. 3. When the grips 64 are displaced in azimuth the slide 248 is depressed against the action of the spring 252 and after release of said grips returns the grips to their neutral positions in azimuth.

In order to enable the gunner to assume his proper position in the turret the bracket 62 is swung about an axis 254 (Fig. 3) of the rod 148 after depressing a latch or lock 256 which is pivoted upon the boss 154 of the turret frame and has formed in it a hole 258 constructed and arranged to receive a stud 260 on the bracket, the latch being constantly urged upward toward the stud by a spring 262. Upon entering the turret the gunner depresses the latch 256 against the action of the spring 262 thus releasing the bracket 62 which is swung aside until said gunner reaches his seat, the bracket then being moved to and locked in its operative position shown in Figs. 3 and 4.

Azimuth hand drive

The azimuth and elevation cranks 48 (Fig. 2), 48a (Figs. 1, 2, 17 and 18) for use in automatically charging the guns 40 respectively are also utilized by the gunner manually to move the turret in azimuth and elevation when there is no power. Such manual operation of the turret is not commonly effected for the purpose of training the guns 40 but usually for the purpose of moving the turret into a suitable position for permitting its retraction into the fuselage.

The azimuth crank 48a (Fig. 17) is rotatable on a bearing boss of a disk 278 fixed to a shaft 276 which is mounted for rotation in the turret 30. Slidable in a bore 264 of the azimuth crank 48a is a plunger 266 having at its inner end a hand button 268 which is engaged by the gunner selectively to move the plunger 266 to a charging position in one of a plurality of spaced openings 270 (only one shown) in a disk 272, or to a turret actuating position in one of a plurality of circumferential spaced recesses 282 in the periphery of the disk 278. The disk 272 is rotatably mounted upon the shaft 276 and has secured to it a sprocket 274 of charger mechanism (not shown). When the plunger 266 is in its turret actuating position shown in Fig. 17, its left end portion is in one of the recesses 282 of the disk 278 so that rotation of the crank 48a causes rotation of the shaft 276. When the plunger 266 extends into one of the openings 270 so as to cause rotation of the sprocket 274 upon rotation of the crank 48a, a notch 280 of the plunger lies opposite the periphery of the disk 278. The positioning of the plunger 266 in the crank 48a preparatory to charging of the gun and the turning of the turret is facilitated by a stop pin 284 which extends into an elongated slot 286 in the plunger.

The shaft 276 is mounted for rotation in the turret frame, which includes the compartment wall 50a, and has secured to it a sprocket 288 (Figs. 6, 17 and 18) which is operatively connected by a chain 290 to a sprocket 292 (Figs. 6, 15 and 18) splined to a sleeve 294 (Figs. 6 and 15) slidingly mounted upon a rod 296 secured by nuts 298 to the turret frame. The sleeve 294 is constantly urged to its idle position against a flange 300 which is secured to the right end (Fig. 15) of the rod 296, by one or more springs 302 (Fig. 15) interposed between the sprocket 292 and a flange of the sleeve 294.

The end of the sleeve 294 is provided with a plurality of teeth 304 constructed and arranged to fit in recesses in the hub 306 of a spiral gear 308 (Figs. 6, 15 and 18) which is rotatably mounted upon bearings 310 (Fig. 15) supported by the rod 296, the teeth and the recesses forming a clutch through which rotation of the sleeve 294 is imparted by the spiral gear 308 to a spiral gear 312 secured to a shaft 314 coupled by mechanism hereinafter described to a shaft 316 of the motor 102. The sleeve 294 is slid along the rod 296 into and out of its operative position, by a shifting yoke 318 (Figs. 6, 15 and 18) which carries pins 320 (Fig. 15) upon which are mounted rolls 322 fitting in a circumferential groove 324 (Figs. 15 and 18) formed in the sleeve.

The shifting yoke 318 is operatively connected, through mechanism which will now be described, to a rod 326 (Figs. 6, 17 and 18) having a hand knob 328 which is located just inside the wall 50a of the gunner's compartment 42. The rod 326 is slidingly mounted in a packing gland 330 (Fig. 17) secured to the wall 50a of the compartment and is pivoted to the forward end of a lever 332

(Figs. 6, 17 and 18) fulcrumed on a stud 334 (Figs. 6 and 17) carried by a bracket forming part of the frame of the turret. The lever 332 is operatively connected by a link 336 with a lever 338 (Figs. 17 and 18) fixed to the lower end of a vertical rod 340 (Figs. 6 and 17) rotatable in the turret frame. Pinned to the upper end of the rod 340 is the shifting yoke 318 which as above explained carries rolls 322 (Fig. 15) fitting in the groove 324 of the sleeve 294. When the hand knob 328 of the rod is in the position illustrated in Fig. 17, the clutch, comprising the teeth 304 (Fig. 15) and the recesses 306, is disengaged, the sleeve 294 being in its position illustrated in Fig. 15.

When during the failure of electricity, it is desirable to move the turret 30 in azimuth, the operator presses on the hand knob 328 causing it to be moved against the packing gland 330 with the result that the sleeve 294 is moved to the left as viewed in Fig. 15 causing the teeth 304 of the sleeve to enter the recesses 306 of the hub of the spiral gear 308. Rotation of the crank 48a effects rotation of the spiral gear 308 and, accordingly, through mechanism hereinafter described rotation of the turret 30 in azimuth, together with the azimuth ring 66, upon the support ring 32.

In order that the turret 30 may be manually moved in azimuth from inside the fuselage, the shaft 276 (Figs. 17 and 18) has fixed to it a bevel gear 333 meshing with a bevel gear 335 secured to a shaft 337 which is rotatably mounted in a bracket of the turret frame and is operated by a flexible cable (not shown) accessible from outside the turret but inside of the fuselage. The clutch formed by the teeth 304 of the sleeve 294 and the recesses 306 in the hub of the spiral gear 308 may be engaged from the outside of the turret by actuating a flexible cable (not shown) which operates an offset bell crank lever 339 having a slot 341 through which passes a rear end portion of the lever 338.

The mechanism, through which the turret 30 by use of the crank 48 is manually driven in elevation from the gunner's compartment 42 and also from the inside of the fuselage but outside of the turret, is substantially the same as the above described mechanism for driving the turret in azimuth. An elevation shifting yoke 342 (Figs. 8 and 9), which is secured to a shaft 344 (Fig. 8) rotatable in the turret frame and corresponds to the azimuth shifting yoke 318, is constructed and arranged to slide a sleeve 346 lengthwise of a rod 348 secured by a nut 350 to the turret frame, causing a clutch 352 corresponding to the clutch formed by the teeth 304 of the sleeve 294 and the recesses 306 of the hub of the spiral gear 308 selectively to be engaged or disengaged. When the clutch 352 is engaged, a spiral gear 354 rotatably mounted upon a bearing on the rod 348 drives a spiral gear 356 (Fig. 9) mounted on a shaft 358 (Fig. 8) and through mechanism hereinafter described rotates the turret 30 in elevation about the common axis 120 (Figs. 7 and 9) of the trunnions 84 (Fig. 7), 84a (Fig. 9).

Before moving the turret 30 in elevation it is necessary to release a friction brake 360 (Fig. 8) which prevents, when the power is off, the turret 30 from rotating into a position in which the barrels 52 of the guns 40 drop down. The vertical shaft 344 has secured to it a lever 362 universally connected to a rod 364 which is universally connected to the lower end of a lever 366 fulcrumed on a pin 368 secured to a friction brake housing 370 forming part of the turret frame. The upper end of the lever 366 is pivotally connected to a link 372 having a slot 374 in which fits a pin 376 carried by the lower arm of a bell crank lever 378 mounted upon a pin 380 secured to the turret frame. A bifurcated end of an upper arm of the bell crank lever 378 straddles a shaft 382 of a solenoid 384 and bears against a collar 386 secured to the shaft which is normally urged to the right as viewed in Fig. 8 by a spring (not shown). Secured to the shaft 358 is a friction wheel 390 which is arranged in the friction brake housing 370 opposite a friction presser drum 392 having a shank 394 which is slidable toward and away from the shaft 358 but is keyed against rotation in the housing. Surrounding the shank 394 and interposed between a face of the presser drum 392 and the housing 370 is a spring 396 which constantly urges the drum 392 toward the friction wheel 390. The shank 394 is straddled by the lower arm of the bell crank lever 378 and has secured to it a collar 399 which is constantly engaged by said lever. When the current is on, the shaft 382 of the solenoid 384 is retracted against the action of the spring 396 and the spring (not shown) of the solenoid causes the bell crank lever 378 to be moved counterclockwise to move the presser drum 392 away from the friction wheel 390. When power fails or is turned off the spring 396 forces the presser drum 392 against the friction wheel 390. In order to move the turret 30 manually through the above mechanism, it is first necessary to release the force applied by the presser drum 392 against the friction wheel 390. Accordingly, as the rod 344 is rotated to cause the clutch 352 formed by the sleeve 346 and the hub of the spiral gear 354 to be engaged, the presser drum 392 is moved to the right as viewed in Fig. 8 to release the shaft 358 for movement in response to movement of the spiral gear 354.

As explained in said Patent No. 2,487,256 when the azimuth lever 222 is displaced a selected number of degrees from its neutral position the turret starts to rotate in azimuth, accelerating rapidly to its maximum rate. A feed-back (not shown) operatively connected to the turret then operates quickly to reduce the rate to a level determined by a rate control mechanism which is included in the aided tracking mechanism and is active, as long as the grips 64 are displaced, to maintain the rate at a level determined by the amount of displacement of the grips. As above explained, the azimuth motor 102 is controlled by the azimuth selsyn transformers or receivers 232, 234 which are responsive to movement of the selsyn transmitters 228, 230 operated by the aided tracking box 100. The shaft 314 (Figs. 6, 15 and 18) is coupled to a shaft 406 (Figs. 6, 7 and 18) which is formed integral with a worm 404 and is secured by a coupling 400 (Fig. 6) rotatable in bearings 402, for movement with the shaft 316 (Figs. 6 and 18) of the motor 102. The worm 404 meshes with a worm gear 408 (Figs. 6, 7 and 18) splined on a shaft 410 rotatably mounted in bearings 412 (Fig. 7) supported by the turret frame and having a spacer 413 upon which is rotatable a hub of a gear carrier 414 mounted in bearings 416 supported by the turret frame. The shaft 410 is bolted to a coupling 418 which is in splined driving relation with a shaft 420 (Figs. 7 and 18) mounted in bearings 422 supported in the hollow passage 106 of the trunnion 84. The shaft 420, the coupling 418 and the shaft 410 together form, in effect, a single shaft. The outer end of the shaft 420 has fixed to it a bevel gear 422 meshing with a bevel gear 424 keyed to the lower end of the vertical shaft 108 which is journaled for rotation in the bearings 110 (Figs. 7 and 16). Fixed to the upper end of the shaft 108 is a pinion 428 (Figs. 16 and 18) meshing with a pinion 430 formed integral with a sleeve 432 (Fig. 16) rotatable upon a bearing shaft 434 which is carried by a yoke 436 (Figs. 2 and 16) swiveled upon a tube 438 fixed to and in effect forming part of the azimuth ring 66. Secured to the sleeve 432 is the sprocket 112 (Figs. 2, 16 and 18) meshing with the rolls 114 (Figs. 2 and 16) which are mounted on upstanding pins 440 (Fig. 16) carried by the support ring 32. Rotatably mounted upon heads 442 of the pins 440 are rolls 444 (Figs. 2 and 16) which fit in a cam groove 446 (Fig. 2) of a cam plate 448 pivoted upon the upper end of the shaft 434, the construction and arrangement being such that the cam plate retains the sprocket 112 in driving relation with the rolls 114 when the vertical drive shaft 108 is rotated thereby effecting rotation of the sprocket and accordingly movement of the turret in azimuth about an axis 450 of the azimuth ring. By mounting the yoke 436 for swinging movement as above described it will be clear that even though the azimuth ring 66 should become distorted as it sometimes does due to changes in the temperature and flexing of the fuselage upon which the azimuth ring is mounted, the sprocket 112 will at all times be held in its proper driving relation with the rolls 114 in order effectively to drive the turret in azimuth.

*Elevation drive*

The elevation motor 104 is provided with a shaft 452 (Fig. 8) operatively connected through a coupling 454 mounted in a ball bearing 456 supported by a turret frame, with a shaft 455 formed integral with a worm 458. The right end of the shaft 455 as viewed in Fig. 8 is coupled to the shaft 358 formed integral with the helical gear 458 and is rotatably mounted in a ball bearing 460 carried by the turret frame and which has secured to it the above described friction wheel 390.

The worm 458 meshes with a worm gear 462 (Figs. 8, 9 and 19) secured to a shaft 451 (Figs. 9 and 18) which is rotatably mounted upon bearings 453 (Fig. 9) mounted in the turret frame and has secured to it a small gear 455 in driving relation with a large gear 457 secured to a shaft 459. The shaft 459 is journaled in the turret frame and has secured to it the above-mentioned pinion 116 which meshes with the arcuate rack 118 which, as above described, is secured to the azimuth ring 66.

The turret 30 may be moved continuously in either direction in azimuth. Mechanism is provided, however, for limiting movement of the turret 30 in positive or negative elevation, movement of the turret together with its guns 40 in negative elevation being automatically stopped when the guns are lowered to positions in which the barrels 52 of the guns are approximately parallel to the axis of rotation 450 of the azimuth ring 66. Because of the shape of the fuselage and the arrangement of the turret in its projected position in the fuselage, the extent to which the guns may be raised depends upon the position of the turret in azimuth. Accordingly, movement of the turret 30 together with the guns 40 in positive elevation is limited by mechanism which automatically causes the elevation lever 184 of the aided tracking box 100 to move to neutral position when the guns are predetermined distances from the fuselage. Because of the great weight of the armed turret, there is also provided mechanism for varying the time at which the guns start to stop in elevation in accordance with the speed of the turret in elevation, thereby insuring against excessive strains being imparted to the trunnions 84, 84a. Fire interrupters or cut-outs are also provided to prevent the firing of the guns when the guns point at portions of the airplane.

As above explained, the rod 178 (Figs. 10, 11 and 18) which is operatively connected to the hand grips 64, is operatively connected to the elevation lever 184 of the elevation rate control box 100 through the limit stop mechanism 180. Pivotally connected to the upper end of the rod 178 is a multi-arm lever 464 (Figs. 10, 11, 12, 13 and 18) pivoted upon a fulcrum pin 466 secured to the turret frame.

The rear end of the multi-arm lever 464 is pivotally connected through a link 472 to a lever or arm 474 pivotally mounted upon a floating or shiftable fulcrum pin 476 operatively connected to the lower end of a rod 478 which as will be explained later, is shifted vertically in response to movement in elevation of the turret 30 in order to limit through mechanism hereinafter described, movement of the turret in positive and negative elevation. The front end of the lever 474 is operatively connected through a link 480 to a bell crank lever 482 (Figs. 10 and 18) which is fulcrumed upon a pin 484 (Fig. 10) secured to the turret frame and is pivoted at its upper end to the link 182 pivoted to the elevation lever 184 of the aided tracking box 100.

The multi-arm lever 464 is operatively connected through a link 486 to the forward end of a lever 488 fulcrumed upon a stud 490 which is carried by an arm 492 pivoted upon a pin 493 secured to the turret frame. The stud 490 has mounted on it a roll or cam follower 494 (Figs. 7, 12 and 18) fitting in a circumferential cam groove 496 formed in a cam 498. The cam 498, through mechanism which will be hereinafter described, is secured for rotation upon a vertical shaft 500 secured to the upper end of a drum or cylinder 502 forming part of a firing cut-out mechanism 504 (Figs. 6 and 12) and having secured to it a depending shaft 506, said shafts being mounted in bearings 508, 510 (Fig. 12) respectively of the turret frame and rotated together with the drum at the same rate that the turret moves in azimuth, the construction and arrangement being such that the cam 498 together with the drum rotates degree for degree with the turret. To the rear end of the lever 488 is pivotally connected a link 512, the lower end of which is pivotally connected to a cam, slide or plate 514 fitting in a guideway 516 (Figs. 11 and 13) of the turret frame, the slide being permitted to move lengthwise but not laterally of the guideway. Resting against the slide 514 is a cam or plate 518, the lower portion of which is pivotally connected to the multi-arm lever 464 by a link 520. The slide 514 is held in the guideway 516 and the plate 518 is held pressed against the slide by a retaining plate 515 which is secured to the turret frame by screws 517. The slide 514 has formed in it a slot or camway 522 (Figs. 11, 13 and 18) which is straight and is vertically disposed from its lower end to a shoulder 524, said slot then being curved to the left as viewed in Fig. 11. The plate 518 is provided with a slot or camway 526, a straight vertical portion of which is in register with the vertical portion of the slot 522 of the slide 514 and a lower portion of which beneath a shoulder portion 528 of the slot, curves downward and to the left as shown in Fig. 11.

As will be explained later, there is associated with the firing control mechanism a rack 530 (Figs. 12, 13 and 18) guided for vertical movement along a rod 532 secured to the turret frame, said rack having a lug 534 provided with a stud 536 upon which is fulcrumed a lever 538 carrying a pin 540. Mounted upon the pin 540 is a roll or stud 542 which extends through the slots 522, 526 formed in the slide 514 and the actuating plate 518 respectively.

Pivotally mounted upon pins 546, 548 (Figs. 11 and 18) secured to the turret frame are bell crank levers 550, 552, the horizontal arm of the lever 550 being pivotally connected to the pin 476 which joins the rod 478 to the lever or arm 474, and the horizontal arm of the upper lever 552 being pivotally connected to the upper end of the rod 478. Fitting in vertical slots 554, 556 of the actuating plate 518 are rolls 558, 560 rotatably mounted upon pins 562, 564 secured to the upper ends of the bell crank levers, slots 566, 568 being provided in the retaining plate 515 of the turret frame to permit movement of the pins.

As the barrels 52 of the guns 40 are moved in elevation the roll 542 moves along the straight portions of the slots 522, 526 in the slide 514 and the actuating plate 518. Assuming that the turret 30 and the guns 40 have been elevated sufficiently to cause the roll 542 to enter the curved portion of the slot 522 above the shoulder 524, this will cause, since the slide 514 is not movable laterally, the roll 542 to be moved to the left as viewed in Fig. 11 with the result that the actuating plate 518 is also moved to the left between the slide and the retaining plate 515 causing through the bell crank levers 550, 552 and the rod 478, downward movement of the floating fulcrum pin 476. This results in the link 480 being lowered and through the above described mechanism, the elevation lever 184 of the aided tracking box 100 being moved to neutral position causing movement of the turret in elevation to cease even though the grips 64 may still be displaced in elevation from their neutral positions.

When the turret 30 and the guns 40 are moved in negative elevation the rack 530 is lowered, causing the roll 542 to be lowered along the straight registering portions of the slots 522, 526. When the roll is above the shoulder 528 of the slot 526 of the actuating plate 518, downward movement of the roll along the lower straight portion of the slot in the slide causes the actuating plate, because of the shape of the lower end of the slot 526, to slide laterally to the right as viewed in Fig. 11. This will result in the bell crank levers 550, 552 moving clockwise as viewed in Fig. 11 and raising the floating fulcrum stud 476, the elevation lever 184 of the aided tracking box 100 being moved back to its neutral position, even though the grips are displaced in elevation, to stop movement of the turret in negative elevation.

In view of the fact that the turret is quite heavy it is essential that the turret when moving fast in elevation, shall start to slow down sooner than when it is moving slowly preparatory to being brought to a stop in elevation. Otherwise severe strains are imposed on the trunnions 84, 84a. Assuming that the turret 30 is being moved in positive elevation, the more the grips 64 are displaced and accordingly the faster the turret is moving, the more will the multi-arm lever 464 be displaced clockwise to move through mechanism above described, the slide 514 downward causing the shoulder 524 of the slot 522 in the slide to be lowered with the result that when the turret is raised fast, the roll 542 engages the curved upper portion of the slot 522 sooner than it would engage such portion were the turret moving slower.

When the turret 30 is being moved in negative elevation the multi-arm lever 464 is displaced counterclockwise from its neutral position shown in Fig. 11 the greater the speed in negative elevation the greater being the counterclockwise displacement of the lever.

In order to vary the time at which the stopping of the turret 30 together with guns in negative elevation is started, in accordance with the speed of the turret in negative elevation, the plate 518 is raised in response to counterclockwise displacement of the multi-arm lever 464, from its neutral position with the result that the lower curved portion of the slot 526, below the shoulder 528 is engaged sooner than when the turret is moving in negative elevation at a slower speed, to cause the plate 518, acted upon by the roll 542 to move to the right as viewed in Fig. 11. Such movement of the plate 518 causes through the bell crank levers 550, 552 the floating fulcrum pin 476 to be lowered, thus moving through mechanism above described, the elevation lever 184 of the aided tracking box 100 to its neutral position.

The guns 40 irrespective of their positions in azimuth, may be swung downward until their barrels 52 are approximately parallel to the axis 450 of rotation of the azimuth ring 66. It will be appreciated, however, that the degree of movement of the guns 40 in positive elevation without interference with the fuselage varies in accordance with the position of the guns in azimuth. Accordingly, the above mentioned cam 496 which turns degree for degree with the turret is provided, the circumferential cam groove 496 acting through the roll 494, the stud 490, the lever 488 and the link 512, to vary the heightwise position of the slide 514 in accordance with the position of the barrels 52 of the guns 40 in azimuth. This will vary the heightwise position of the slot 522 of the slide or plate 514 and will accordingly vary the extent of movement of the guns in positive elevation. The plates 514 and 518 may be described as having camways 522, 526 straight portions of which are in register and end portions of which diverge. The plates 514, 518 may be described as movable into different adjusted positions lengthwise of the straight portions of the camways 522, 526 in accordance with the speed of the turret in elevation, and the plate 514 may be described as being moved lengthwise of said straight portions in accordance with the position of the turret in azimuth.

The rack 530 (Figs. 12, 13 and 18) is raised and lowered upon the rod 532 by a pinion 570 (Figs. 6, 12 and 18) secured to a shaft 572 rotatably mounted in the turret frame and driven by a smaller pinion 574 which is fixed to a shaft 576 mounted for rotation in the turret frame and is in meshing engagement with a rack 578 (Fig. 12) slidingly mounted in a guideway 580 (Fig. 6) of the turret frame and upon a rod 582 secured to said frame. As will be explained later, mounted upon the rod 582 (Figs. 6 and 12) between a spacer washer 584 and flanges of the rack 578 are levers 586 forming part of a fire interrupter 588 (Fig. 6).

The racks 530, 578 are raised and lowered in timed relation with movement of the guns 40 in elevation through the following mechanism. An arcuate gear 590 (Figs. 7 and 18) which is secured by screws 592 (Fig. 7) to the azimuth ring 66 and is concentric with the axis 120 of the trunnions 84, 84a has meshing with it a gear 594 secured to a shaft 596 rotatably mounted in ball bearings 598 supported by the turret. The shaft 596 is coupled to a shaft 600 which is rotatable in a bearing 602 in the frame and has secured to it a bevel gear 604 driving a bevel gear 606 secured to a shaft 608 rotatable in the turret frame. Also secured to the shaft 608 is a gear 610 meshing with a gear 612 which is fixed to the shaft 576 to which the pinion 574 is secured. It will, therefore, be clear that movement of the turret 30 in elevation causes rotation of the pinions 574, 570 and through the above described mechanism the raising of the racks 578, 530 in timed relation with movement of the turret in elevation.

*Compensating*

Since the azimuth motor 102 is secured to the turret frame it will be appreciated that unless otherwise compensated for by mechanism which will be hereinafter described, movement of the turret in elevation will cause rotation of the shaft 420 and accordingly through the vertical shaft 108, movement of the turret 30 in azimuth. In order to insure against movement of the turret 30 in elevation imparting an appreciable error to the azimuth movement of the turret there is provided mechanism herein-described for rotating the shaft 316 of the azimuth motor 102 through the use of the selsyn transformers or receivers 232, 234, an amount sufficient to "wash out" the rotation which would normally be imparted to the shaft 420 due to its rotation in elevation with the turret.

Secured to the shaft 600 (Fig. 7) is a pinion 614 (Figs. 7, 14 and 18) meshing with a pinion 616 rotatably mounted upon a bearing supported by a stub shaft 618 secured to a bracket forming part of the turret frame. The pinion 616 meshes with the outer teeth 620 (Fig. 14) of a ring gear 622 (Figs. 7 and 18) supported by pins 624 upon which are mounted rollers 626 constructed and arranged to engage ledge portions 628, 630 (Fig. 7) of the gear carrier 414. Rotatably supported upon bearings mounted upon pins 634 secured to the gear carrier 414 are planetary gears 636 which mesh with inner teeth 638 of the ring gear and with teeth of a sun gear 640 secured to the shaft 410. To the inner end of the gear carrier 414 is secured by screws 642 (Fig. 7) a bevel gear 644 which meshes with a bevel gear 646 secured to the lower end of a vertical shaft 648 rotatably mounted in bearings 650 supported in a housing secured to the turret frame. To the upper end of the shaft 648 are secured gears 652, 654 (Figs. 6, 7 and 18) the gear 652 being operatively connected through gears 656, 658 pinned to a shaft 660 rotatable in bearings of the turret frame with a gear 662 secured to a shaft 664 of the azimuth selsyn transformer or receiver 234. The gear 654 is operatively connected through gears 666, 668 secured to a shaft 670 and gears 672, 674 secured to a shaft 676 with a gear 677 fixed to a shaft 678 of the azimuth selsyn transformer or receiver 232, the gear ratios of the various drives being such that the selsyn transformer or receiver 234 rotates thirty-one times as fast as the azimuth selsyn transformer or receiver 232. Secured to the lower end of the shaft 676 is a gear 680 meshing with a gear 682 fixed to the upper end of a shaft 684 rotatably mounted in a bracket bolted to the turret frame and driving through bevel gears 686, 688 a shaft 690 (Figs. 12 and 18) and through bevel gears 692, 694 the shaft 506 which is secured to the drum 502 of the firing cut-out mechanism.

When the turret 30 rotates only in azimuth the ring gear 622 is fixed and the sun gear 640 which is fixed to the shaft 410, through the planetary gears 636 operates the gear carrier 414 and accordingly the selsyn shaft 648 and a gear 647 secured to a computer box shaft 649 at the correct speeds.

As the turret 30 rotates in elevation, the gear 594 rotates as it moves along the arcuate gear 590 and through the planetary system, above described which may be referred to as a differential, operates the selsyn shaft 648 and the computer box shaft 649, at speeds which prevent rotation of such gears about their axes as they swing as units in elevation about the axis 120 of the trunnions 84, 84a. Rotation of the shaft 410 due to movement of the turret in elevation, through the differential and the drives above described, imparts to the selsyns 232, 234 a "pressure" sufficient to operate the worm 404 about its axis at a rate sufficient to balance the velocity of the shaft 410 due to its movement in elevation, the azimuth error caused by the rotation of the turret in elevation being corrected by the use of the proper gear ratios in the differential.

It is desirable to stop the firing of the guns 40 when such guns are directed at any part of the airplane and accordingly there is provided the above-mentioned fire interrupter or cut-out 588 (Fig. 6). The outer face of the drum 502 has a plurality of raised masking portions or areas 696 (only two shown) which are engaged by circuit breaking mechanism, hereinafter described when one or more of the guns are directed at the tail parts of the airplane, for example. As above explained, the levers or feelers 586 are raised and lowered in timed relation to the movement of the turret 40 in elevation and accordingly movement of the guns about the axis 120, the drum 502 being rotated degree for degree with the rotation of the azimuth ring and accordingly the turret about the axis 450 (Fig. 1). When one of the guns 40 is pointed at the tail of the airplane, for example, a pin 698 of the associated lever engages the raised portion 696 of the drum with the result that an associated rocker arm 700 rotatably mounted upon a rod 702 of the turret frame is rocked to actuate a micro-switch 704 in a gun firing circuit 710 to stop firing of one of the guns 40 which are electrically fired as disclosed in an application Serial No. 721,058 filed January 9, 1947 in the name of Paul H. Dixon.

In order further to insure that the firing circuit 710 shall be interrupted at the proper time to prevent firing at parts of the airplane, each of the rocker arms 700 has a terminal 706 which is drawn away from a terminal 708 when the rocker arm is swung counterclockwise as viewed from above (Fig. 6) to cause the micro-switch to break the circuit.

When the gunner enters the turret 30 through the door 60 and assumes the position shown in Fig. 1 the turret is in its retracted position inside the fuselage of the airplane. After the turret 30 has been moved to its projected position outside of the fuselage of the airplane and the various circuits have been energized, the gunner by displacing the grips 64 about the axes 224, 226, causes, through the above described mechanism, the turret to rotate in azimuth and elevation, respectively. The turret 30 may be rotated continuously in azimuth but has the above-mentioned mechanism for automatically limiting movement of the turret in negative and positive elevation even though the gunner has the grips displaced from their neutral positions about the axis 226. By powering the turret 30 from within, the weight of the mechanism for operating the turret has been reduced to a minimum and since said turret is at all times heated and pressurized said mechanism will operate effectively under substantially normal temperature and pressure conditions.

Having thus described our invention, what we claim as new and desire to secure by Letters Patent of the United States is:

In an armed mount, a turret, a gun secured to the turret, means comprising motors for moving the turret and the gun as a unit in azimuth and elevation, manually operated grips, azimuth and elevation levers, connections for operatively connecting the azimuth and elevation levers to the grips, said connections comprising an arm having a shiftable fulcrum pin, said levers being displaceable from neutral positions upon actuation of said grips to cause the motors to be driven at different speeds in accordance with the displacement of the levers from their neutral positions, and mechanism for limiting movement of the turret and accordingly the gun in elevation, said mechanism comprising a pair of adjacent plates having camways, straight center portions of which are in register and end portions of which diverge from one another, means for moving into different adjusted positions both of said plates lengthwise of the straight central positions of the camways in accordance with the speed of the turret in elevation and for moving one of said plates into different adjusted positions lengthwise of the straight central portions of the camways in accordance with the position of the turret in azimuth, a roll movable in the camways in timed relation to movement of the turret in elevation, means operatively connected to one of said plates and to the fulcrum pin for varying the position of said pin when the guns reach predetermined positions in elevation to move the elevation lever to a neutral position thereby stopping movement of the turret in elevation without effecting movement of portions of said connections between the hand grips and said arm.

WALTER E. NAUGLER.
ERNEST W. STACEY.

REFERENCES CITED

The following references are of record in the file of this patent:

UNITED STATES PATENTS

| Number | Name | Date |
|---|---|---|
| 2,356,152 | Edwards et al. | Aug. 22, 1944 |
| 2,373,990 | Barnhart | Apr. 17, 1945 |
| 2,378,670 | Walle et al. | June 19, 1945 |
| 2,396,529 | Phillips | Mar. 12, 1946 |
| 2,399,200 | Brown | Apr. 30, 1946 |
| 2,408,277 | Soenke | Sept. 24, 1946 |
| 2,409,406 | Trotter | Oct. 15, 1946 |
| 2,414,608 | Pontius | Jan. 21, 1947 |
| 2,415,967 | Pontius | Feb. 18, 1947 |
| 2,434,653 | Holschuh et al. | Jan. 20, 1948 |
| 2,434,654 | Watkins | Jan. 20, 1948 |
| 2,450,541 | Chase et al. | Oct. 5, 1948 |
| 2,483,385 | Humphrey | Sept. 27, 1949 |